United States Patent [19]
Aoki

[11] 3,807,920
[45] Apr. 30, 1974

[54] MULTICOLOR INJECTION MOLDING MACHINE

[76] Inventor: Katashi Aoki, 6037, Oaza Minamijo, Sakaki-machi, Japan

[22] Filed: June 6, 1972

[21] Appl. No.: 260,092

[30] Foreign Application Priority Data
June 15, 1971  Japan.............................. 46-51030
Oct. 1, 1971  Japan.............................. 46-76851

[52] U.S. Cl................... 425/134, 425/130, 264/245
[51] Int. Cl................................................. B29f 1/12
[58] Field of Search .......... 425/134, 130, 120, 246; 164/108; 264/246, 245

[56] References Cited
UNITED STATES PATENTS
| | | | |
|---|---|---|---|
| 2,485,323 | 10/1949 | Schwartz.......................... | 425/130 X |
| 3,702,750 | 11/1972 | Veneria ............................. | 425/130 |
| 2,241,180 | 5/1941 | Burke ................................ | 264/245 |
| 3,482,284 | 12/1969 | Rees .................................. | 425/130 |
| 3,435,483 | 4/1969 | Heiner............................... | 425/130 |

FOREIGN PATENTS OR APPLICATIONS
| | | | |
|---|---|---|---|
| 1,311,054 | 10/1962 | France............................... | 425/130 |
| 1,072,799 | 1/1960 | Germany ........................... | 425/130 |

*Primary Examiner*—J. Spencer Overholser
*Assistant Examiner*—David S. Safran

[57] ABSTRACT

A multicolor injection molding machine comprising two sets of metal molds each set consisting of a mold core and a cavity bushing, all of the mold cores being made into a similar construction having a number of recessed portions which form partial forming cavities when any one of the mold cores is engaged with a first cavity bushing, and the entire surface of each mold core forming a main forming cavity when the mold core is engaged with a second cavity bushing, a fixed plate for supporting said two cavity bushings in a plane, a movable plate for supporting said two mold cores in a rotatable manner, means for reciprocating the movable plate toward and away from the fixed plate to engage and release said two sets of metal molds, a plurality of injection devices provided through the fixed plate in a portion corresponding to the first cavity bushing for injecting a plurality of different colored molten resins into the partial forming cavities defined by the recessed portions and the first cavity bushing, and another injection device provided through the fixed plate in a portion corresponding to the second cavity bushing for injecting a molten resin into the main forming cavity thereby to form the main portion of an article unitary combined with portions having different colors formed in the partial forming cavities.

1 Claim, 13 Drawing Figures

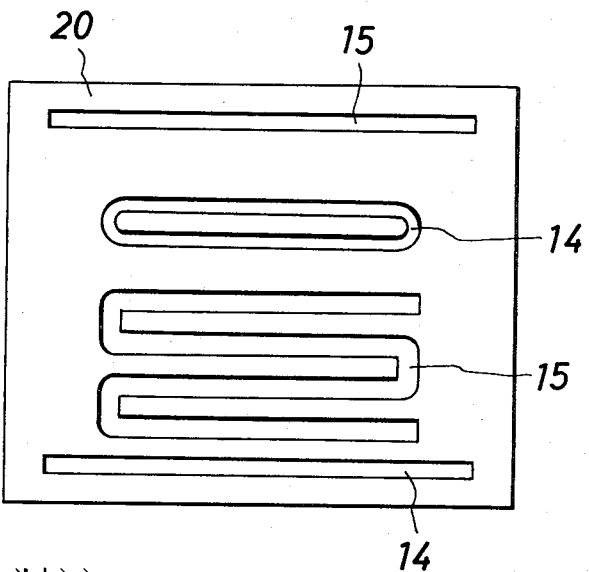
Fig.3
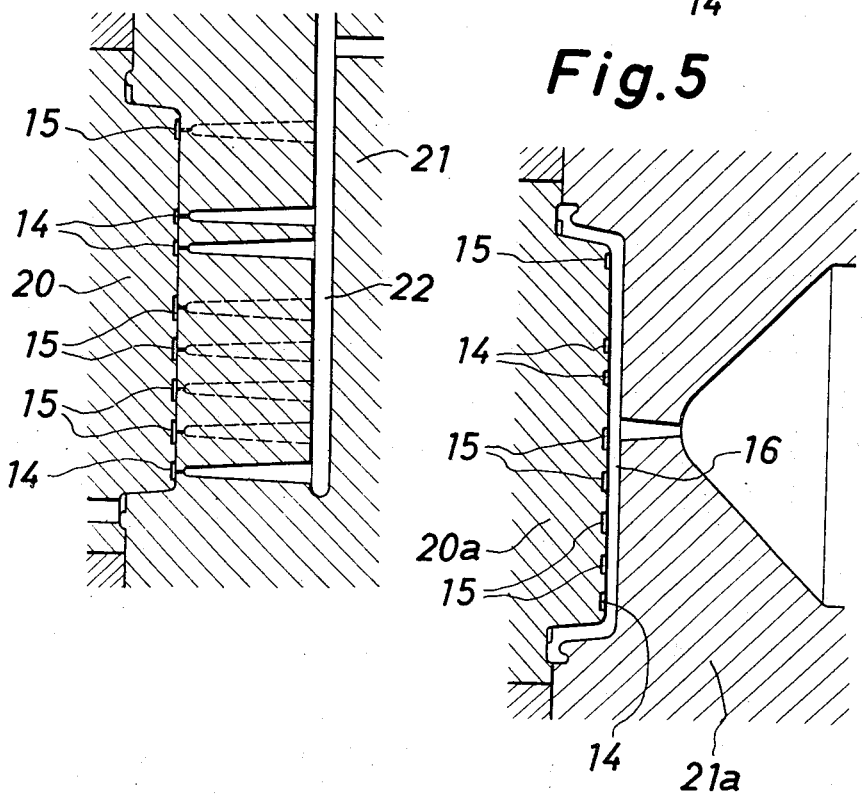
Fig.4
Fig.5

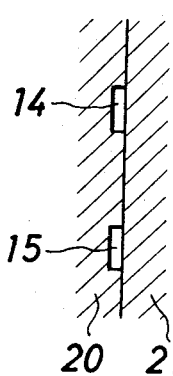
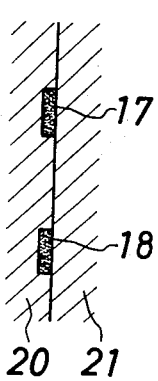
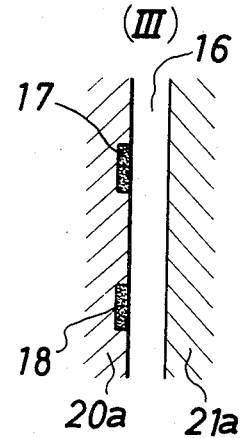
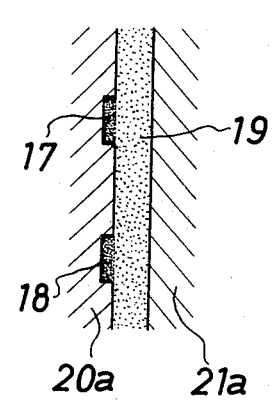
FIG. 6 (I)    FIG. 6 (II)    FIG. 6 (III)    FIG. 6 (IV)
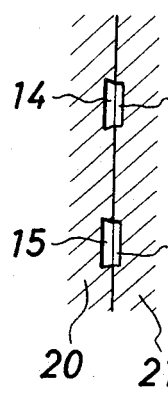
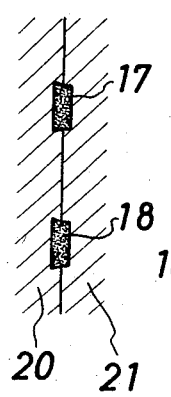
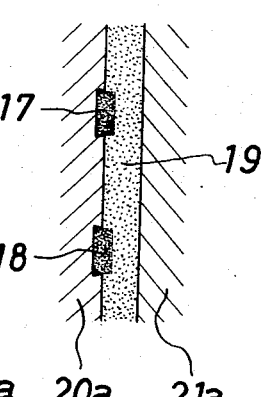
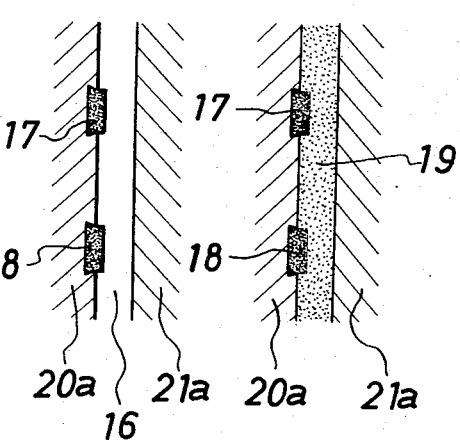
FIG. 7 (I)    FIG. 7 (II)    FIG. 7 (III)    FIG. 7 (IV)

3,807,920

MULTICOLOR INJECTION MOLDING MACHINE

BACKGROUND OF THE INVENTION

This invention relates to injection molding machines, and more particularly to a type thereof wherein movable parts of the metal molds are shifted their positions rotatingly, and molded products of synthetic resin having a plurality of different colors can be thereby obtained.

Heretofore, the production of multicolor products in an injection molding machine has required metal molds of a number equivalent to the number of colors, and the number of production processes in the injection molding machine has increased in accordance with the increase in the number of colors. Accordingly, it has been considered difficult to produce molded articles having more than three colors in one injection molding machine.

SUMMARY OF THE INVENTION

A primary object of the present invention is to provide a novel injection molding machine wherein molded products of more than two colors can be produced by two sets of metal molds without increasing the number of processes in proportion to the number of colors.

Another object of the invention is to provide a novel injection molding machine wherein various design or patterns of different colors appearing on the surface of the products can be produced accurately.

Still another object of the invention is to provide an injection molding machine wherein the two sets of the metal molds can be operated by a single mold clamping device, whereby the construction and operation of the injection molding machine are much simplified.

These and other objects of the invention can be achieved by a novel injection molding machine comprising two sets of metal molds including two molding cores and two cavity bushings, each of the two molding cores being made into a similar construction having a number of recessed portions provided in the surface, the recessed portions forming partial forming cavities when the molding core engages a first cavity bushing, and the entire surface of the molding core forming a main forming cavity when the molding core engages a second cavity bushing, a fixed plate for supporting the two cavity bushings in a plane, a movable plate for supporting the two molding cores in a freely rotatable manner, means for reciprocating the movable plate toward and away from the fixed plate to engage and release the two sets of metal molds, a plurality of injection devices provided through the fixed plate in a portion opposing to the first cavity bushing for injecting a plurality of different color resins into the partial forming cavities formed by the recessed portion and the first cavity bushing, and another injection device provided through the fixed plate in a portion opposing to the second cavity bushing for injecting a molten resin to form the main portion of the products formed by the injection molding machine.

The nature, principle, and the utility of the present invention will be more clearly understood from the hereinafter described detailed description of the invention when read in conjunction with the accompanying drawings.

BRIEF DESCRIPTION OF THE DRAWINGS

In the drawings:

FIG. 3 is a front view of a molding core;

FIG. 4 is a sectional plan view of a molding core and a first cavity bushing when these members are in the closed state;

FIG. 5 is a sectional plan view of a molding core and a second cavity bushing when the two members are in the closed state;

FIGS. 6(I)–(IV) show sectional views indicating the injection molding processes, sequentially; and FIGS. 7(I)–(IV) show sectional views sequentially indicating the injection molding processes of another embodiment of the invention wherein recesses forming partial forming cavities are cut in both of the molding cores and also in the first cavity bushing.

DETAILED DESCRIPTION OF THE INVENTION

Figure 1:
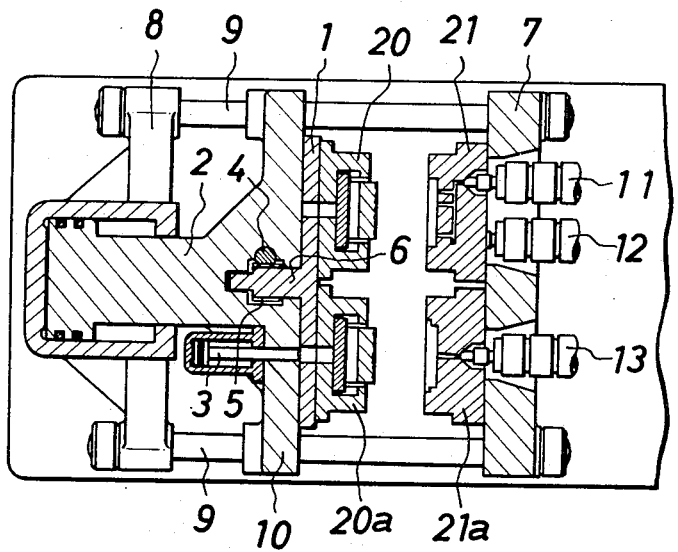
FIG. 1 is a plan view, partly in section, of a multicolor injection molding machine according to the present invention in the mold opening state.
Figure 2:
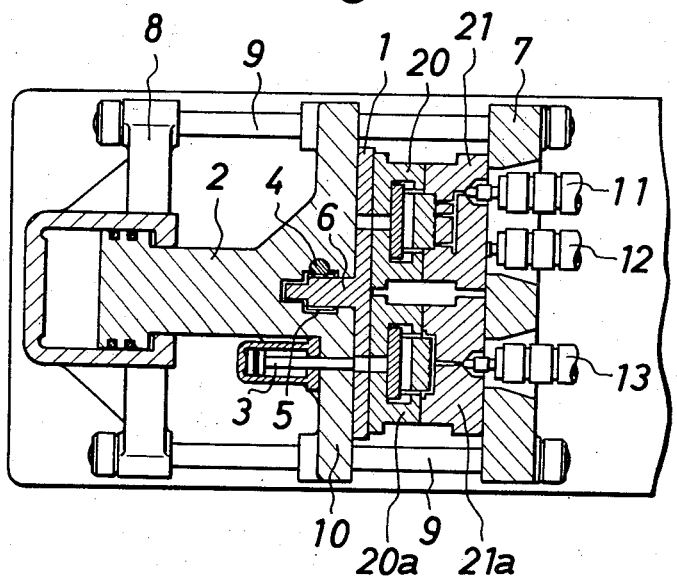
FIG. 2 is a plan view, partly in section, of the same injection molding machine shown in FIG. 1 in a state of the molds being closed.

Referring now to FIGS. 1 and 2, there is indicated a multicolor injection molding machine according to the present invention in the opening state and the closing state, respectively. The injection molding machine comprises a rotatable plate 1, a mold clamping ram 2 on which the rotatable plate 1 is rotatably mounted, a knockout ram 3 for releasing the products, a rotating piston 4 having a rack engaging with a pinion 5 fixed to the central shaft 6 of the rotatable plate 1, a fixed plate 7, and a frame 8. The fixed plate 7 and the frame 8 are rigidly connected together by means of tie-rods 9, and a planer portion 10 integral with the mold clamping ram 2 is reciprocally supported along the tie-rods 9. The frame 8 includes therein the mold clamping ram 2. Thus, the rotatable plate 1 is rotatably supported on the planer portion 10 of the mold clamping ram 2 as described above.

On the rotatable plate 1, two mold cores 20 and 20a are mounted at positions equidistant and on the opposite sides of the central shaft 6. Likewise, on the fixed plate 7, a first and a second cavity bushings 21 and 21a, which engage the molding cores 20 and 20a respectively, are mounted at a suitable distance. Through the fixed plate 7, three injection devices 11, 12, and 13 are extended from the outside toward the cavity bushings, and of the three injection devices, two devices 11 and 12 are provided for the cavity bushing 21 and one device 13 is provided for the cavity bushing 21a.

As will be apparent from FIGS. 3 and 4, a number of recessed portions forming partial forming cavities 14 and 15 are provided in each surface of the mold cores 20 and 20a, while in the cavity bushing 21, merely a flat surface contacting with the remainder portion other than the forming cavities 14 and 15 of the mold cores 20 and 20a, and a plurality of runners 22 for injecting molten resin of different colors into the partial forming cavities 14 and 15 are provided.

On the other hand, in the cavity bushing 21a, the inner surface is retracted so that a main forming cavity 16 is thereby formed between the inner surface and the surface of the mold core 20 or 20a when the second cavity bushing 21a engages a mold core 20 or 20a.

Because of the above described construction of the injection molding machine according to the present invention, the two sets of the metal molds are closed, as shown in FIG. 2, when the planer portion 10 of the mold clamping ram 2 advances, leaving the partial forming cavities 14 and 15 between the mold core 20 and the first cavity bushing 21, while a main forming cavity 16 is formed between the mold core 20a and the second cavity bushing 21a.

Herein, if molten synthetic resins of different colors are injected from the injecting devices 11 and 12 into the partial forming cavities 14 and 15, partial formations 17 and 18 as shown in FIG. 6 (II) having different colors can be obtained.

After the completion of the partial formations 17 and 18, the planer portion 10 of the mold clamping ram 2 is retracted thereby opening the metal molds. In this case, the partial formations 17 and 18 remain attached to the side of the partial forming cavities 14 and 15 because of the difference between the contacting areas in the partial forming cavities 14 and 15 and in the first cavity bushing 21. This sticking effect to the side of the partial forming cavities 14 and 15 will be exaggerated when the side walls of the recessed cavities 14 and 15 are reversely tapered (see FIG. 7).

The rotatable plate 1 is then rotated so that the mold core 20 is brought to engage the second cavity bushing 21a when the mold clamping ram 2 is again advanced. In this case, a main forming cavity 16 as shown in FIG. 6 (III) is formed between the two members, wherein a molten synthetic resin of different color is injected through the injection device 13 and a main portion 19 of an article is thereby formed as shown in FIG. 6 (IV).

During the formation of the main portion 19, the previously formed partial formations 17 and 18 are merged with the main portion 19 thereby forming a design or pattern having different colors unified with the main portion 19 of the article thus produced.

After the completion of the article, the metal molds are opened, and the product attached to the mold core 20a will now be knocked out by means of the knockout ram 3.

In FIG. 7, there are indicated sequential injection molding processes of a different embodiment of the invention wherein partial forming recesses 14a and 15a are further provided in the molding surface of the first cavity bushing 21. In this embodiment, it is necessary that the side walls of the partial forming recesses 14 and 15 are reversely tapered as described before.

Although the injection molding processes have been described with respect to a single product, in the actual operation of the injection molding machine, all of the injection devices for the first and the second cavity bushings 21 and 21a are operated simultaneously, and with the subsequent rotation of the rotatable plate 1, multicolored products can be produced continuously.

Furthrmore, the number of colors employed in the products can be changed by changing the number of injection devices nozzle-touched to the first cavity bushing 21, or the number of colors may be reduced to two by equalizing the color of either one of the partial formations 17 and 18 to that of the main portion 19.

Since in the injection molding machine according to the present invention, the multicolored products can be obtained with the partial formations of different colors being injected precedingly, there is no necessity of increasing the number of metal molds in proportion to the number of colors. In addition, the interchange of the movable molds between the stationary molds can always be accomplished in one process regardless of the number of colors, whereby the molding operation in the present invention can be substantially simplified than in the cases of the conventional multicolor injection molding machines.

I claim:

1. A multicolor injection molding machine comprising:
   A. two sets of metal molds, each set including:
      i. a mold core and a cavity bushing;
      ii. all of the mold cores being of a similar construction and having a plurality of separate recessed portions in the surface thereof which form individual partial forming cavities when any one of the mold cores is engaged with a first cavity bushing; and
      iii. the entire surface of each mold core forming a main forming cavity when the mold core is engaged with a second cavity bushing;
   B. a fixed plate supporting said two cavity bushings in a plane;
   C. a movable plate and a rotatable plate thereon supporting said two molding cores in a rotatable manner;
   D. means for reciprocating the movable plate to engage and release said two sets of metal molds;
   E. means for rotating said rotatable plate for selectively positioning said mold cores alternately and sequentially in said cavity bushings;
   F. a plurality of injection devices provided through said fixed plate in a portion corresponding to the first cavity bushing for injecting a plurality of different colored resins into the individual partial forming cavities defined by the recessed portions and the first cavity bushing to form partial molded articles;
   G. another injection device provided through the fixed plate in a portion corresponding to the second cavity bushing for injecting a molten resin into said main forming cavity thereby to form the main portion of an article combined with said partial molded articles made by the injection molding machine; and
   H. the side walls of said recesses forming said partial forming cavities being reversely tapered for enhanced adherence therein of the injected resins.

* * * * *